(12) United States Patent
Craft et al.

(10) Patent No.: US 6,435,159 B1
(45) Date of Patent: Aug. 20, 2002

(54) FUEL INJECTED INTERNAL COMBUSTION ENGINE WITH REDUCED SQUISH FACTOR

(75) Inventors: Todd D. Craft; Erick Lee Gruber, both of Pleasant Prarie, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/567,575

(22) Filed: May 10, 2000

(51) Int. Cl.$^7$ .................................................. F02B 23/00
(52) U.S. Cl. ........................ 123/298; 123/661; 123/664
(58) Field of Search ................................. 123/298, 304, 123/305, 275, 276, 283, 285, 661, 664

(56) References Cited

U.S. PATENT DOCUMENTS

| | | |
|---|---|---|
| 954,219 A | 4/1910 | Slick |
| 1,142,545 A | 6/1915 | Wade |
| 1,157,387 A | 10/1915 | Haury |
| 1,265,857 A | 5/1918 | Wygodsky |
| 1,424,585 A | 8/1922 | Nielsen |
| 1,527,923 A | 2/1925 | Rothardt |
| 1,568,638 A | 1/1926 | Summers |
| 1,580,340 A | 4/1926 | Severin |
| 1,597,248 A | 8/1926 | Rathbun |
| 1,620,124 A | 3/1927 | Nielsen |
| 1,671,826 A | 5/1928 | Joslyn |
| 1,942,657 A | 1/1934 | Meyer |
| 1,967,243 A | 7/1934 | Hesselman |
| 2,028,760 A | 1/1936 | Dillstrom |
| 2,111,282 A | 3/1938 | Edwards |
| 2,119,633 A | 6/1938 | Edwards |
| 2,121,409 A | 6/1938 | Ricardo |
| 2,154,358 A | 4/1939 | Ross |
| 2,154,975 A | 4/1939 | Dufour |
| 2,166,679 A | 7/1939 | Burke |
| 2,191,745 A | 2/1940 | Barkeij |
| RE21,750 E | 3/1941 | Starr |
| 2,265,677 A | 12/1941 | Straub |
| 2,318,333 A | 5/1943 | Ricardo |
| 2,412,821 A | 12/1946 | Malin et al. |

(List continued on next page.)

FOREIGN PATENT DOCUMENTS

| | | |
|---|---|---|
| DE | 739397 | 9/1943 |
| DE | 1576002 | 5/1970 |
| DE | 2544762 | 4/1977 |
| EP | 0486003 | 5/1992 |
| GB | 2039614 | 8/1980 |
| JP | 0159411 | 6/1989 |

*Primary Examiner*—Erick Solis
(74) *Attorney, Agent, or Firm*—Timothy J. Ziolkowski; Cook & Franke SC

(57) ABSTRACT

A direct fuel injection internal combustion engine configured to reduce engine knock during high speed operation of the engine is provided. The engine comprises a cylinder head including a lower surface portion closing an upper end of a cylinder to define a combustion chamber between a piston upper surface and the cylinder head lower surface portion. The lower surface portion has therein an upwardly extending recess. The recess has a lower end which is complementary with the piston surface and an upper end. The lower end of said recess has an area in a plane perpendicular to a longitudinal axis of the cylinder and that area comprises a range from more than 20% to about 65% of the cross-sectional area of the cylinder.

25 Claims, 3 Drawing Sheets

U.S. PATENT DOCUMENTS

| | | |
|---|---|---|
| 2,431,857 A | 12/1947 | Fenney |
| 2,533,442 A | 12/1950 | Falcon |
| 2,587,339 A | 2/1952 | du Rostu |
| 2,638,081 A | 5/1953 | Spannhake |
| 2,735,413 A | 2/1956 | Meyer et al. |
| 2,742,025 A | 4/1956 | Knolle et al. |
| 2,760,478 A | 8/1956 | Boghetto |
| 2,768,615 A | 10/1956 | Taylor et al. |
| 2,900,966 A | 8/1959 | Brueder |
| 2,942,594 A | 6/1960 | Turlay |
| 3,425,399 A | 2/1969 | Ward et al. |
| 3,443,552 A | 5/1969 | von Seggern et al. |
| 3,498,275 A | 3/1970 | Hardenberg |
| 3,621,821 A | 11/1971 | Jarnuszkiewicz |
| RE27,367 E | 5/1972 | von Seggern et al. |
| 3,680,305 A | 8/1972 | Miller |
| 3,734,069 A | 5/1973 | Akiyama et al. |
| 3,817,227 A | 6/1974 | Onishi |
| 3,875,909 A | 4/1975 | May |
| 3,892,208 A | 7/1975 | Anderson et al. |
| 3,923,019 A | 12/1975 | Yamada |
| 3,934,562 A | 1/1976 | Isaka |
| 3,980,057 A | 9/1976 | Sanda et al. |
| 4,044,730 A | 8/1977 | Masaaki et al. |
| 4,100,082 A | 7/1978 | Clason et al. |
| 4,126,106 A | 11/1978 | Witzky |
| 4,162,661 A * | 7/1979 | Nakanishi et al. .......... 123/661 |
| 4,170,966 A | 10/1979 | Schmidt |
| 4,175,533 A | 11/1979 | Goto et al. |
| 4,182,276 A | 1/1980 | Sato et al. |
| 4,224,905 A | 9/1980 | von Seggern et al. |
| 4,259,933 A | 4/1981 | Nakanishi et al. |
| 4,317,432 A | 3/1982 | Noguchi et al. |
| 4,318,377 A | 3/1982 | Occella et al. |
| 4,320,727 A | 3/1982 | Artman |
| 4,370,959 A | 2/1983 | McNair, Jr. |
| 4,416,229 A | 11/1983 | Wood |
| 4,421,081 A | 12/1983 | Nakamura et al. |
| 4,444,166 A | 4/1984 | Kovacs et al. |
| 4,445,467 A | 5/1984 | Westerman et al. |
| 4,446,830 A | 5/1984 | Simko et al. |
| 4,446,831 A | 5/1984 | Artman |
| 4,452,221 A | 6/1984 | Keating |
| 4,465,032 A | 8/1984 | Artman |
| 4,480,620 A | 11/1984 | Tange et al. |
| 4,481,921 A | 11/1984 | Tsukahara et al. |
| 4,522,173 A | 6/1985 | Agache |
| 4,538,567 A | 9/1985 | Grow |
| 4,538,568 A | 9/1985 | Fujikawa et al. |
| 4,545,346 A | 10/1985 | Grow |
| 4,549,508 A | 10/1985 | Fujimoto |
| 4,572,123 A | 2/1986 | Evans |
| 4,574,753 A | 3/1986 | von Seggern |
| 4,700,671 A | 10/1987 | Matsushita |
| 4,719,880 A | 1/1988 | Schlunke et al. |
| 4,784,098 A | 11/1988 | Artman |
| RE32,802 E | 12/1988 | Kline |
| 4,788,942 A | 12/1988 | Pouring et al. |
| 4,790,270 A | 12/1988 | McKay et al. |
| 4,844,025 A | 7/1989 | Sheaffer |
| 4,881,513 A | 11/1989 | Hamanaka |
| 4,899,698 A | 2/1990 | Thery |
| 4,920,937 A | 5/1990 | Sasaki et al. |
| 4,926,806 A | 5/1990 | Ahern et al. |
| 4,942,858 A | 7/1990 | Wagner et al. |
| 4,964,381 A | 10/1990 | Shiozaki et al. |
| 5,020,484 A | 6/1991 | Ishikawa et al. |
| 5,086,735 A | 2/1992 | Melchior et al. |
| 5,103,777 A | 4/1992 | Daikoku |
| 5,105,795 A | 4/1992 | Ozawa et al. |
| 5,127,379 A | 7/1992 | Kobayashi et al. |
| 5,144,919 A | 9/1992 | Franz |
| 5,163,396 A | 11/1992 | Fukuda et al. |
| 5,170,759 A | 12/1992 | Ito |
| 5,170,760 A | 12/1992 | Yamada et al. |
| 5,205,254 A | 4/1993 | Ito et al. |
| 5,209,200 A | 5/1993 | Ahern et al. |
| 5,211,145 A | 5/1993 | Ichikawa et al. |
| 5,215,053 A | 6/1993 | Ito |
| 5,230,321 A | 7/1993 | Lambert et al. |
| 5,233,956 A | 8/1993 | Ueda et al. |
| 5,237,972 A | 8/1993 | Groff et al. |
| 5,249,557 A | 10/1993 | Katoh et al. |
| 5,269,243 A | 12/1993 | Mochizuki |
| 5,291,865 A | 3/1994 | Sasaki |
| 5,329,902 A | 7/1994 | Sakamoto et al. |
| 5,372,105 A | 12/1994 | Nagao et al. |
| 5,373,820 A | 12/1994 | Sakamoto et al. |
| 5,692,468 A | 12/1997 | Haman et al. |
| 6,237,579 B1 * | 5/2001 | Singh .................. 123/661 |

* cited by examiner

FUEL INJECTED INTERNAL COMBUSTION ENGINE WITH REDUCED SQUISH FACTOR

BACKGROUND OF THE INVENTION

The present invention is generally related to fuel-injected internal combustion engines, and, more particularly, the present invention is related to fuel-injected two-stroke engines. Still more particularly, the invention relates to marine propulsion devices including such engines.

Known two-stroke direct fuel injection internal combustion engines include a bowl in the upper surface of the piston and a dome or recess in the lower surface of the cylinder head. It is also known to locate a fuel injector at the top of the dome or recess and to have a spark plug extend into the recess. Fuel spray from the fuel injector may be ignited after the fuel spray bounces off the piston or is otherwise introduced into the combustion chamber.

It is known to provide a direct fuel-injected engine having a combustion chamber configured to provide a squish factor of approximately four-to-one, where squish factor is as subsequently defined herein. See U.S. Pat. No. 5,692,468 assigned to the same assignee of the present invention. It will be appreciated that the engine described in that patent has advantageously contributed to the advancement of internal combustion engines, it would be desirable, however, to provide an improved direct fuel-injected engine having a reduced squish factor to improve scavenging and reduce knock tendencies in high speed operating conditions.

SUMMARY OF THE INVENTION

Generally speaking, the present invention fulfills the foregoing needs by providing a direct fuel injection internal combustion engine comprising a cylinder head including a lower surface portion closing an upper end of a cylinder to define a combustion chamber between a piston upper surface and the cylinder head lower surface portion. The lower surface portion has therein an upwardly extending recess. The recess has a lower end which is complementary with the piston surface and an upper end. The lower end of said recess has an area in a plane perpendicular to a longitudinal axis of the cylinder and that area comprises a range from more than 20% to about 65% of the cross-sectional area of the cylinder.

The present invention may further fulfill the foregoing needs by providing a direct fuel injection internal combustion engine comprising an engine block defining a cylinder having a longitudinal axis, an upper end, and a cross-sectional area in a plane perpendicular to that axis. The engine further comprises a piston reciprocally moveable in the cylinder along the axis. A cylinder head includes a lower surface portion closing the upper end of the cylinder to define a combustion chamber between the piston upper surface and the cylinder head lower surface portion. The lower surface portion extends generally perpendicular to the axis and has therein an upwardly extending recess. The recess comprises a conical-shaped recess and has a lower end and an upper end. The lower end of the recess has an area in a plane perpendicular to the axis. The area comprises a predetermined fraction of the cross-sectional area of said cylinder. The fraction is chosen sufficiently high to reduce engine knock during high speed operation of the engine.

Figures 1, 2:
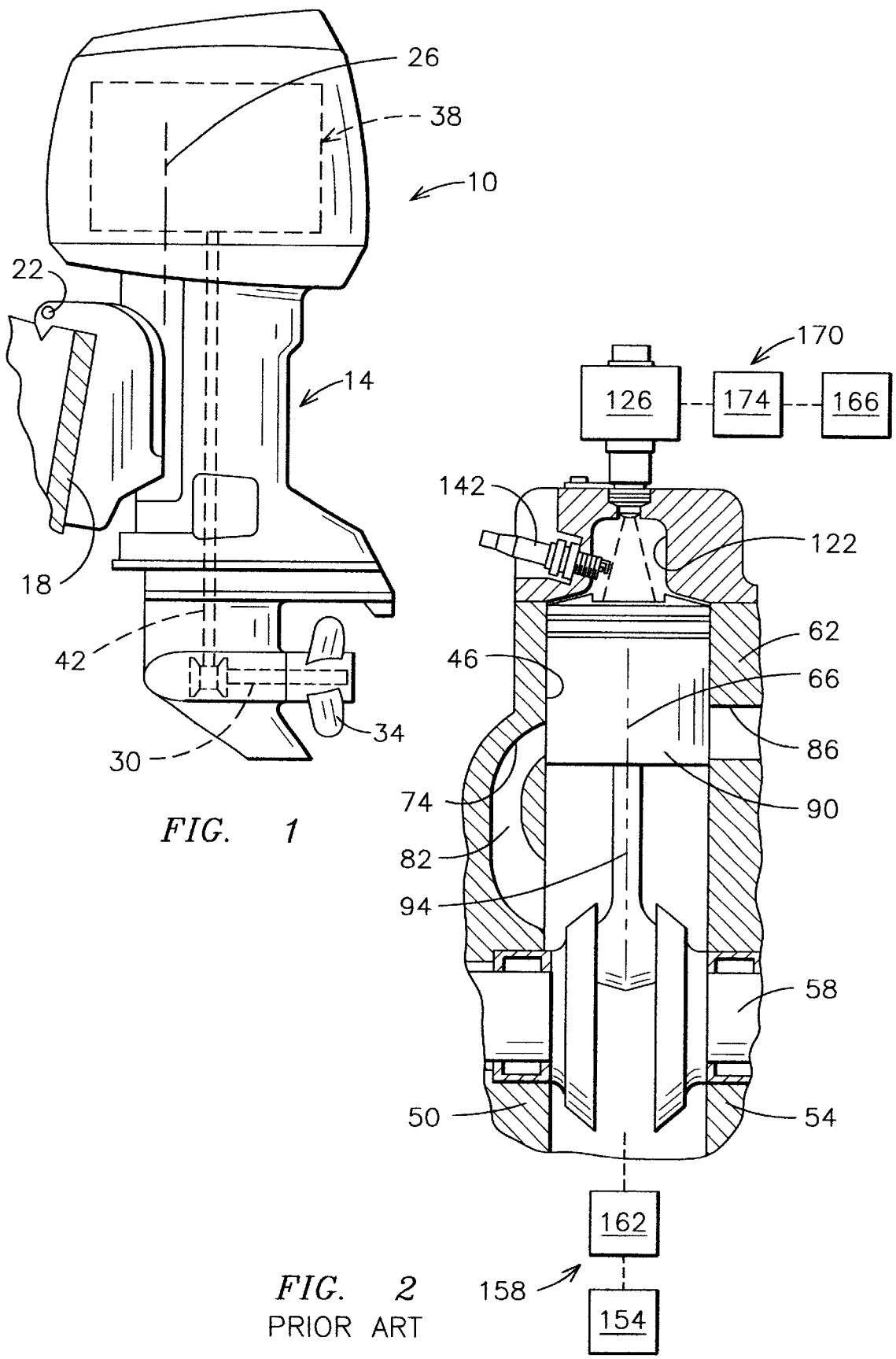
FIG. 1 is a side elevational view of an exemplary marine propulsion device embodying the invention.
FIG. 2 is a partial sectional view of a prior art engine having a combustion chamber configured to provide a relatively high squish area.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

An exemplary marine propulsion device 10 embodying the invention is illustrated in FIG. 1.

The marine propulsion device 10 includes an outboard drive unit 14 adapted to be mounted to the transom 18 of a boat for pivotal tilting movement relative thereto about a generally horizontal tilt axis 22 and for pivotal steering movement relative thereto about a generally vertical steering axis 26. The drive unit 14 includes a propeller shaft 30 having a propeller 34 fixed thereto. The drive unit 14 also includes a fuel-injected, two-stroke internal combustion engine 38 drivingly connected to the propeller shaft 30 by a standard drive train 42. In one exemplary embodiment of the invention, the engine 38 may be a six-cylinder V-type engine. It should be understood, however, that the invention is applicable to other types of engines with any number of cylinders. It should be further understood that the present invention need not be limited to outboard drives since other types of marine propulsion devices, such as stern drives, could also benefit from the present invention.

Figure 3:
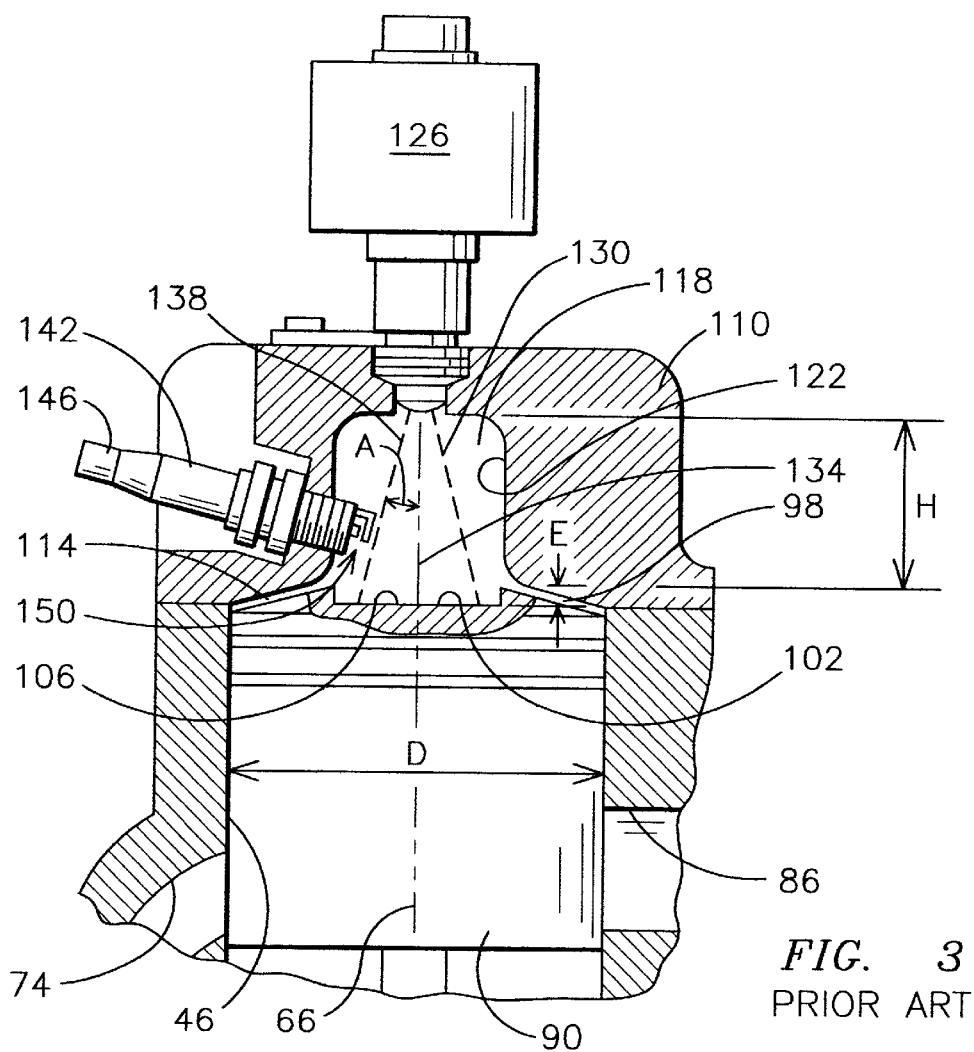
FIG. 3 is an enlarged portion of FIG. 2.

FIGS. 2 and 3 illustrate a prior art construction described in greater detail in U.S. Pat. No. 5,692,468, assigned to the same assignee of the present invention and herein incorporated by reference. One cylinder 46 of the engine is illustrated in FIG. 2. The engine includes a crankcase 50 defining a crankcase chamber 54 and having a crankshaft 58 rotatable therein. An engine block 62 defines the cylinder 46, which has a longitudinal axis 66 and an upper end (the upper end in FIG. 2). In the illustrated construction, the cylinder 46 has a diameter D of 3.600 inches, so that the cross-sectional area of the cylinder 46 in a plane perpendicular to the axis 66 is approximately 10.18 square inches. The engine block 62 also defines respective intake ports communicating with the cylinder 46. Each of the ports communicates with the crankcase chamber 54 via a respective transfer passage 82 (one shown in FIG. 2). The engine block 62 also defines an exhaust port 86 which communicates with the cylinder 46 and which may be located diametrically opposite one of the intake ports.

The engine also includes a piston 90 reciprocally moveable in the cylinder 46 along the axis 66. The piston 90 is drivingly connected to the crankshaft 58 by a crank pin 94. The piston 90 has (see FIG. 3) an upper surface 98 having therein a circular bowl 102. The bowl 102 has a planar bottom surface 106 perpendicular to the axis 66. The engine also includes a cylinder head 110 including a lower surface portion 114 closing the upper end of the cylinder 46 so as to define a combustion chamber 118 between the piston upper surface 98 and the cylinder head lower surface portion 114. When the piston 90 is at top dead center, the piston upper surface 98 is spaced a predetermined distance from the cylinder head lower surface portion 114. The cylinder head lower surface portion 114 extends generally perpendicular to the cylinder axis 66 and has therein an upwardly extending recess or dome 122. The cylinder head lower surface portion 114 surrounding the recess 122 is concave and is complementary with the piston upper surface 98. The recess 122 is located directly above the bowl 102 and is generally cylindrical, being centered on the cylinder axis 66. The recess 122 has an upper end and a lower end (the upper and lower ends in FIG. 3). In the illustrated construction, the recess 122 has a diameter of 1.600 inches and an area in a plane perpendicular to the cylinder axis 66 of approximately 2.011 square inches. The squish factor is the ratio of the area of the cylinder 46 outside the recess 122 to the area of the recess 122. Thus, the recess area is equal to approximately one-fifth or 20% of the cross-sectional area of the cylinder 46, so that the combustion chamber 118 has a squish factor of approximately four to one. Also, in the illustrated construction, the recess 122 has a height H conveniently chosen so that its height is approximately one-half the cylinder diameter.

The engine also includes a fuel injector 126 mounted on the cylinder head 110 for injecting fuel into the upper end of the recess 122. The fuel injector 126 creates a cone 130 of fuel spray surrounded by a volume of fuel vapor, the cone 130 being centered on the cylinder axis 66. As shown in FIG. 3, fuel spray cone 130 may be centered on a cone axis 134 (also cylinder axis 66) and has an outside envelope defining a line 138 in a plane including cone axis 134 (the plane of the paper), line 138 and cone axis 134 forming a suitably dimensioned acute angle A.

The engine 38 also includes a spark plug 142 which is mounted on the cylinder head 110 and which extends into the recess 122. In the illustrated construction, the spark plug 142 extends along a plug axis 146 which is located in the plane of the cone axis 134. Also, the spark plug 142 is located directly above the intake port 74. The spark plug 142 includes a spark gap 150 located outside the fuel spray cone 130 and within the fuel vapor volume, so that the spark plug 142 initially ignites fuel vapor rather than directly igniting the fuel spray. Ignition is timed so that the spark plug 142 ignites the fuel spray before the fuel spray strikes the piston upper surface 98. The engine 38 also includes a source of primary lubricant, i.e. an oil tank 154 (shown schematically in FIG. 2), and a lubricant supply system 158 for supplying oil from the oil tank 154 to the crankcase 50 of the engine 38. The lubricant supply system 158 includes an oil pump 162 communicating between the oil tank 154 and the crankcase chamber 54. The lubricant supply system 158 supplies oil directly to the various crankcase chambers 54 of the engine 38.

The engine also includes a source of fuel, i.e. a fuel tank 166 (shown schematically in FIG. 2), and a fuel supply system 170 for supplying fuel to the various fuel injectors 126 of the engine 38. The fuel supply system 170 includes a fuel pump 174 communicating between the fuel tank 166 and the fuel injectors 126. The engine may include a source of secondary lubricant which is mixed with the fuel injected into the cylinders 46. The purpose of the secondary lubricant is not lubrication of the engine 38, but is reduction of spark plug fouling. Although a separate lubricant source could be employed the source of fuel and the source of secondary lubricant may be a single tank (the fuel tank 166) of mixed fuel and oil.

Figure 4A:
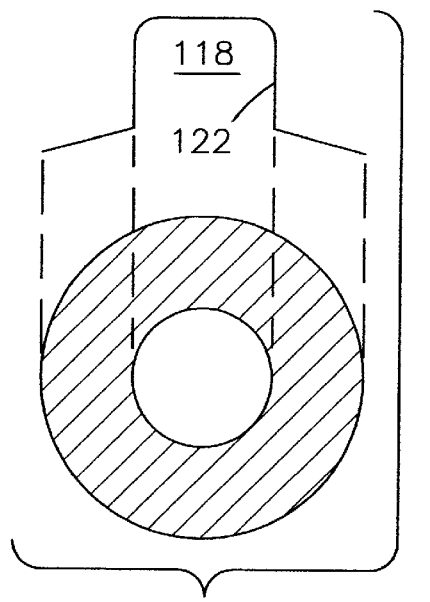
FIG. 4 illustrates respective plots comparing the squish area provided by the engine of the present invention, illustrating a symmetrical recess in FIG. 4B, against the squish area (FIG. 4A) provided by the engine of FIG. 2.
Figure 4B:
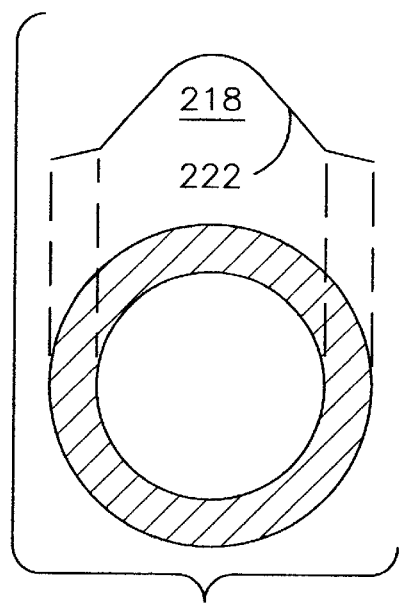

FIG. 4, made up of FIGS. 4A and 4B, illustrates respective plots comparing the squish area provided by the engine of the present invention (FIG. 4B) against the prior art engine of FIG. 2. The area of the cylinder outside the recess is referred to by those skilled in the art as the squish area. In each plot, the respective squish area or region is represented by the dashed area under its corresponding combustion chamber. As shown in FIG. 4A, the recess area for the engine shown in FIG. 2 is equal to approximately one-fifth the cross-sectional area of the cylinder 46, so that there is a squish area comprising approximately 80% of the cross-sectional area of the cylinder 46.

As shown in FIG. 4B, the present invention recognizes that providing a reduced squish factor allows for improved scavenging in a combustion chamber 218 and reducing knock tendencies in high speed operating conditions. By way of example and not of limitation, a recess 222 may be chosen to have at its lower end an area approximately equal to 50% of the cross-sectional area of the cylinder 46, so that there is a squish area comprising approximately 50% of the cross-sectional area of the cylinder 46. As shown in FIG. 4B, the recess area may correspond to the base of a conically-shaped recess having a cone-axis co-axially positioned relative to the cylinder axis. It will be appreciated that depending on the particular implementation further reductions in the squish area may be achieved, such as 35% to 40%, provided it is understood that tradeoffs of improved high speed operation versus low speed performance are acceptable. It will be appreciated that the present invention may be particularly useful for two-stroke direct fuel injected engines having a compression ratio ranging from about 5.75 to 1 to about 7.75 to 1. Further, the present application may be particularly useful in direct fuel-injected engines using either a homogeneous combustion process or stratified combustion process or both. Generally, in a homogeneous combustion process the air-fuel mixture is supplied to the cylinder via the transfer ports with much of the fuel already vaporized during its residence in the hot crankcase. The remainder of the liquid fuel vaporizes during the combustion process so that by the time ignition takes place, the combustion chamber is filled with a vapor-air exhaust gas residual mixture which is evenly distributed throughout the combustion space. In a stratified combustion process there will be zones in the combustion space which are at differing air-fuel ratios.

It will be appreciated by those skilled in the art that the fuel injector described above is one example of a type of injector commonly referred to as single fluid, direct fuel injection delivery. Another type of injector uses a high pressure pump for pressurizing a high pressure line to deliver fuel to the fuel injector through a fuel rail that delivers fuel to each injector. A pressure control valve may be coupled at one end of the fuel rail to regulate the level of pressure of the fuel supplied to the injectors to maintain a substantially constant pressure thereat. The pressure may be maintained by dumping excess fuel back to the vapor separator through a suitable return line. The fuel rail may incorporate nipples that allow the fuel injectors to receive fuel from the fuel rail. Thus, in this case, it is believed that a substantially steady pressure differential—as opposed to a pressure surge—between the fuel rail and the nipples causes the fuel to be injected into the fuel chamber. Another example of direct fuel injection is a dual-fluid injection system that could be used include those that include a compressor or other compressing means configured to provide the source of gas under pressure to effect injection of the fuel to the engine, that is, fuel injectors that deliver a metered individual quantity of fuel entrained in a gas. It is to be understood, however, that the present invention is not limited to any particular type of direct fuel injector.

Figure 5A:
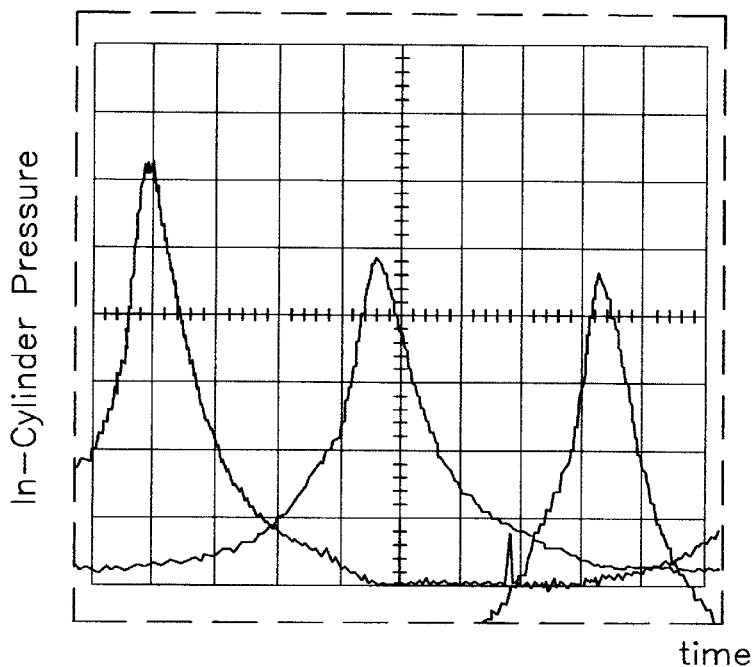
FIG. 5 illustrates respective plots comparing respective signals indicative of in-cylinder pressure plotted as a function of time as may be achieved by the engine of the present invention and the engine of FIG. 2.
Figure 5B:
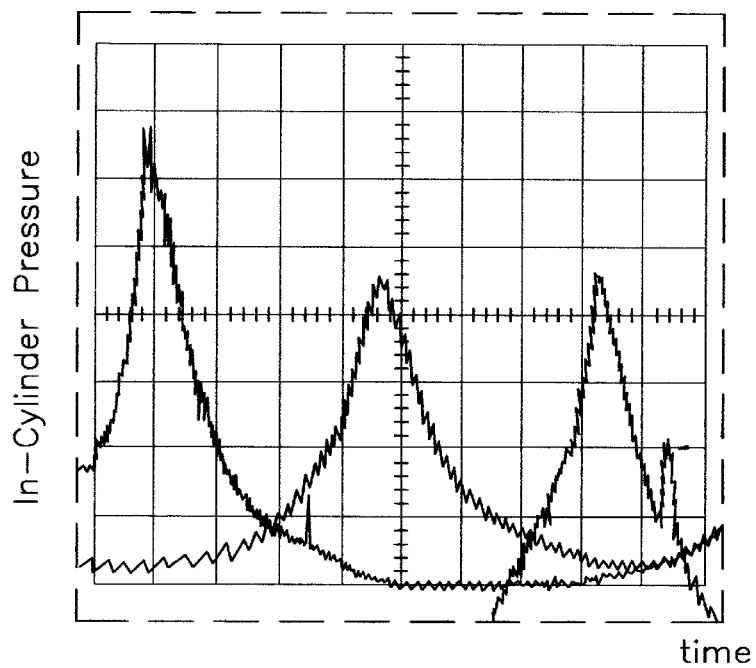
Figure 6:
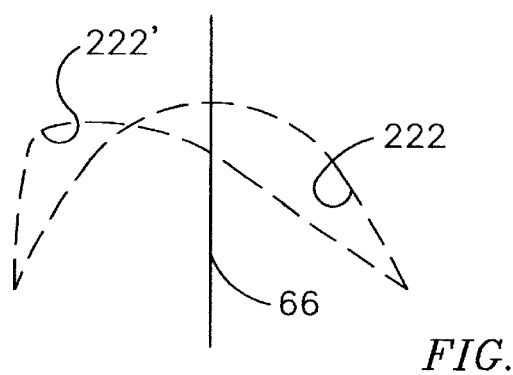
FIG. 6 illustrates the symmetrical exemplary recess of FIG. 4B and an asymmetrically configured recess embodying the present invention.

FIG. 5, made up of FIGS. 5A and 5B, illustrates respective plots of experimentally-derived test data for comparing respective in-cylinder pressure plotted as a function of time as may be respectively achieved by the engine of the present invention and the engine of FIG. 2. In particular, FIG. 5A plots in-cylinder pressure corresponding to the engine of the present invention, that is, an engine having a combustion chamber configured to provide a squish area of 50% of the cross-sectional area of the cylinder 46. It will be appreciated from FIG. 5A that the plot shown therein lacks the pressure spikes seen in the plot of FIG. 5B. The spikes represent knock tendencies present in the engine of FIG. 2 during high speed operating conditions. For purposes of the present invention, high speed operating conditions of the engine may comprise engine speeds about one half of the top rated speed of the engine and higher RPM. For example, if the top rated speed of the engine is 6000 RPM, then by way of example and not of limitation, the high speed engine conditions may develop from about 3000 RPM and higher RPM. Thus, the present invention conveniently allows for reducing such knock tendencies by providing an engine having a combustion chamber with a reduced squish area. It will be appreciated by those skilled in the art that in general recess 222 need not be centered on the cylinder axis. For example, as shown in FIG. 6, the recess could be configured as an asymmetrical recess 222' relative to the cylinder axis, provided the squish area and the volume defined by such non-symmetrical recess remain the same relative to the corresponding parameters of the symmetrical recess, drawn in a solid line.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A direct fuel injection internal combustion engine comprising:
    an engine block defining a cylinder having a longitudinal axis, an upper end, and a cross-sectional area in a plane perpendicular to said axis;
    a piston reciprocally moveable in said cylinder along said axis; and
    a cylinder head including a lower surface portion closing said upper end of said cylinder to define a combustion chamber between said piston upper surface and said cylinder head lower surface portion, said lower surface portion extending generally perpendicular to said axis and having therein an upwardly extending recess, said recess having a lower end and an upper end, said lower end of said recess having an area in a plane perpendicular to said axis, said area comprising a range from more than 20% to about 65% of the cross-sectional area of said cylinder.

2. The internal combustion engine of claim 1 wherein said engine is a two-cycle engine.

3. The internal combustion engine of claim 1 wherein said engine further comprises a fuel injector for directly injecting fuel into the combustion chamber.

4. The internal combustion engine of claim 3 wherein said engine further comprises a spark plug having a spark gap located within the chamber to ignite the fuel delivered by the fuel injector.

5. The internal combustion engine of claim 3 wherein the fuel injector is configured to deliver to the chamber fuel that is entrained in a predetermined gas.

6. The internal combustion engine of claim 5 wherein the predetermined gas is air.

7. The internal combustion engine of claim 5 wherein the fuel is compressed to be entrained within the predetermined gas by a compressor.

8. The internal combustion engine of claim 3 wherein the fuel injector is configured to deliver fuel to the chamber not entrained in a gas.

9. The internal combustion engine as set forth in claim 8 wherein the fuel injector delivers fluid due to a predetermined pressure surge.

10. The internal combustion engine of claim 1 comprising a compression ratio of about 5.75-to-1 to about 7.75-to-1.

11. The internal combustion engine as set forth in claim 8 wherein the fuel injector delivers fluid due to a pressure differential.

12. The internal combustion engine of claim 1 wherein the recess is conically shaped and a cone axis is co-axial relative to the cylinder axis.

13. The internal combustion engine of claim 1 wherein the recess is asymmetrically configured relative to the cylinder axis.

14. A direct fuel injection internal combustion engine comprising:
    an engine block defining a cylinder having a longitudinal axis, an upper end, and a cross-sectional area in a plane perpendicular to said axis;
    a piston reciprocally moveable in said cylinder along said axis; and
    a cylinder head including a lower surface portion closing said upper end of said cylinder to define a combustion chamber between said piston upper surface and said cylinder head lower surface portion, said lower surface portion extending generally perpendicular to said axis and having therein an upwardly extending recess, said recess comprising a conical-shaped recess and having a lower end and an upper end, said lower end of said recess having an area in a plane perpendicular to said axis, said area comprising about 50% of the cross-sectional area of said cylinder.

15. A direct fuel injection internal combustion engine comprising:
    an engine block defining a cylinder having a longitudinal axis, an upper end, and a cross-sectional area in a plane perpendicular to said axis;
    a piston reciprocally moveable in said cylinder along said axis; and
    a cylinder head including a lower surface portion closing said upper end of said cylinder to define a combustion chamber between said piston upper surface and said cylinder head lower surface portion, said lower surface portion extending generally perpendicular to said axis and having therein an upwardly extending recess, said recess comprising a conical-shaped recess and having a lower end and an upper end, said lower end of said recess having an area in a plane perpendicular to said axis, said area comprising a predetermined fraction of the cross-sectional area of said cylinder, said fraction being chosen sufficiently high to reduce engine knock during high speed operation of the engine.

16. The internal combustion engine of claim 15 wherein the predetermined fraction ranges from above 20% to about 65%.

17. The internal combustion engine of claim 15 wherein the predetermined fraction is approximately 50%.

18. A direct fuel injection internal combustion engine comprising:

a cylinder head including a lower surface portion closing an upper end of a cylinder to define a combustion chamber between a piston upper surface and said cylinder head lower surface portion, said lower surface portion having therein an upwardly extending recess, said recess having a lower end which is complementary with the piston surface and an upper end, said lower end of said recess having an area in a plane perpendicular to a longitudinal axis of the cylinder, said area comprising a range from more than 20% to about 65% of the cross-sectional area of said cylinder.

19. The direct fuel injection engine of claim 18 further comprising a fuel injector located in the upper end of the recess.

20. The direct fuel injection engine of claim 18 wherein said engine is a two-cycle engine.

21. The direct fuel injection engine of claim 19 wherein said engine further comprises a spark plug having a spark gap located within the chamber to ignite the fuel delivered by the fuel injector.

22. The direct fuel injection engine of claim 18 having a compression ratio of about 5.75-to-1 to about 7.75-to-1.

23. The direct fuel injection engine of claim 18 wherein the recess is conically shaped and a cone axis is co-axial relative to the cylinder axis.

24. The direct fuel injection engine of claim 18 wherein the recess is asymmetrically configured relative to the cylinder axis.

25. The direct fuel injection engine of claim 18 wherein the lower end of the recess area comprises approximately 50% of the cross-sectional area of said cylinder.

* * * * *